US010126924B1

(12) United States Patent
Mierau et al.

(10) Patent No.: US 10,126,924 B1
(45) Date of Patent: Nov. 13, 2018

(54) EFFICIENT TRANSMISSION OF PREDEFINED MESSAGES IN A MESSAGING ENVIRONMENT

(71) Applicant: PATH MOBILE INC PTE. LTD., Singapore (SG)

(72) Inventors: Dustin R. Mierau, San Francisco, CA (US); Edmund Kim, San Francisco, CA (US); Emilie Kim, San Francisco, CA (US)

(73) Assignee: PATH MOBILE INC PTE. LTD., Singapore (SG)

( * ) Notice: Subject to any disclaimer, the term of this patent is extended or adjusted under 35 U.S.C. 154(b) by 479 days.

(21) Appl. No.: 14/745,221

(22) Filed: Jun. 19, 2015

Related U.S. Application Data

(60) Provisional application No. 62/015,334, filed on Jun. 20, 2014.

(51) Int. Cl.
G06F 3/033 (2013.01)
G06F 3/0484 (2013.01)
G06F 3/0485 (2013.01)
H04L 12/58 (2006.01)

(52) U.S. Cl.
CPC ........ *G06F 3/04842* (2013.01); *G06F 3/0485* (2013.01); *G06F 3/04847* (2013.01); *H04L 51/04* (2013.01)

(58) Field of Classification Search
CPC .... G06F 17/24; G06F 17/273; G06F 17/3087; G06F 3/167; G06F 11/0706; G06F 11/0715
See application file for complete search history.

(56) References Cited

U.S. PATENT DOCUMENTS

| 2002/0057263 | A1* | 5/2002 | Keely | G06F 3/04883 345/179 |
| 2010/0273447 | A1* | 10/2010 | Mann | H04M 1/72519 455/405 |
| 2010/0293236 | A1* | 11/2010 | Wisner | H04L 51/18 709/206 |
| 2011/0313923 | A1* | 12/2011 | Votaw | G06F 21/31 705/43 |
| 2013/0017846 | A1* | 1/2013 | Schoppe | G06F 3/0488 455/466 |
| 2014/0223347 | A1* | 8/2014 | Seo | G06F 3/0482 715/769 |

(Continued)

*Primary Examiner* — Di Xiao
(74) *Attorney, Agent, or Firm* — Cantor Colburn LLP

(57) ABSTRACT

When the user requests a contact interface, the messaging module displays a contact interface that includes multiple rows. Each row includes a contact interface element that is associated with a contact with which the user has or is exchanging messages. From the contact interface the user can request to transmit a shortcut message to a contact from a set of predefined shortcut messages. Each shortcut message is predefined in that the content to be included in the message is already set. The user indicates the shortcut message to transmit to a contact by shifting the content interface element associated with the contact in a horizontal direction. When the user ends the shifting of the contact interface element, the messaging module automatically transmits a shortcut message to the contact based on the magnitude of the shift performed by the user.

14 Claims, 15 Drawing Sheets

(56) References Cited

U.S. PATENT DOCUMENTS

2014/0282243 A1* 9/2014 Eye .................. G06F 3/0482
715/810
2015/0248389 A1* 9/2015 Kahn .................. G06F 17/241
715/230

* cited by examiner

US 10,126,924 B1

EFFICIENT TRANSMISSION OF PREDEFINED MESSAGES IN A MESSAGING ENVIRONMENT

CROSS REFERENCE TO RELATED APPLICATIONS

This application claims the benefit of U.S. Provisional Application No. 62/015,334, filed Jun. 20, 2014, which is incorporated by reference in its entirety.

BACKGROUND

1. Field of Art

The disclosure generally relates to messaging, and in particular to allowing users to quickly send predefined messages in a messaging environment.

2. Description of the Related Art

With the widespread use of mobile devices, the use of messaging applications for exchanging messages between users has grown. However, creating and sending a message can be a time consuming process. For example, typing a message can take a long time, especially as mobile devices get smaller and the keyboards presented on the displays of mobile devices get smaller. Current messaging applications do not provide ways to allow users to quickly send messages with minimal user interaction.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1A:
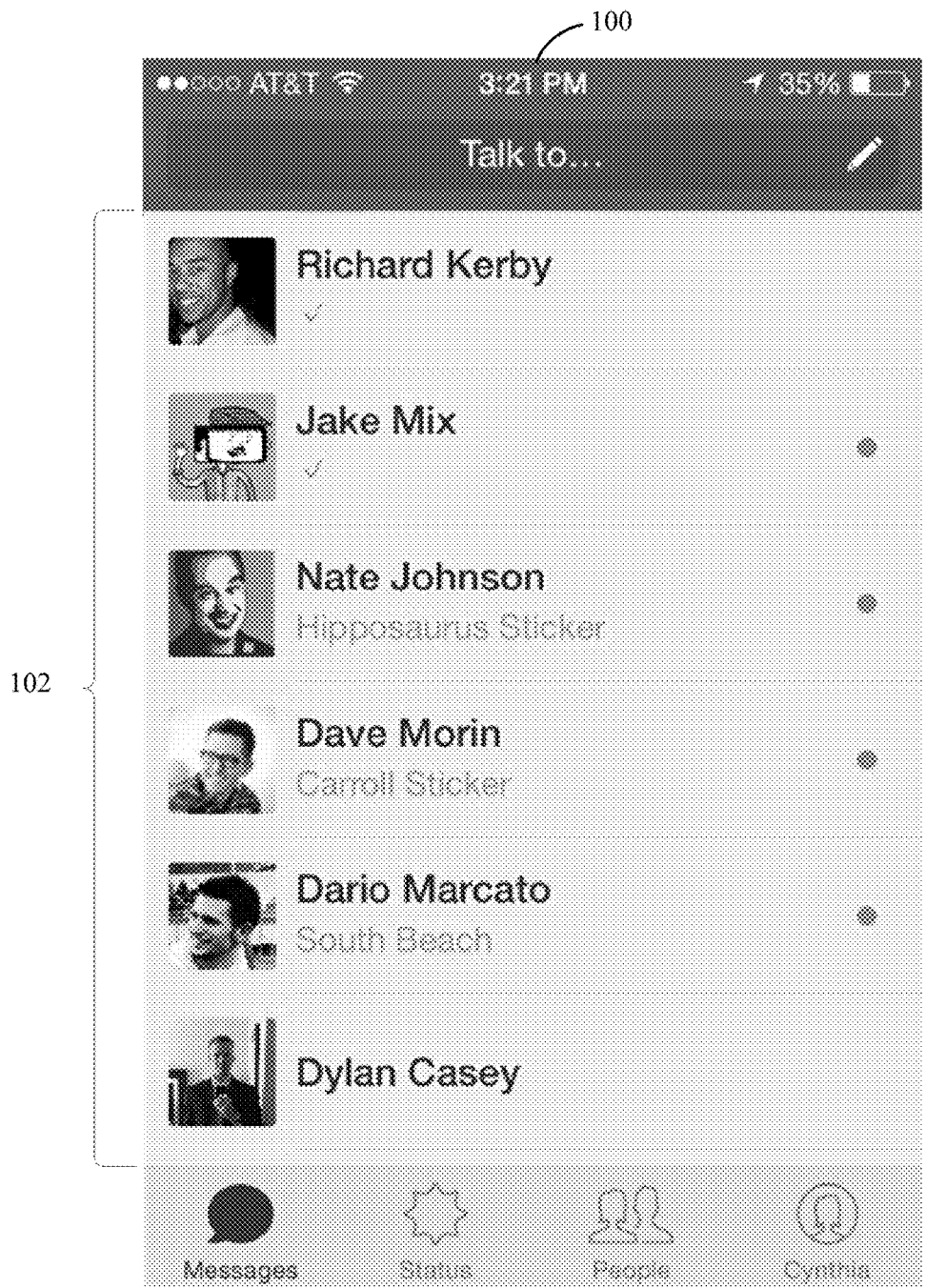
FIGS. 1A-1F illustrate examples of a contact interface according to one embodiment.

One embodiment of a disclosed system, method and computer readable storage medium includes allowing users of a messaging system to quickly send predefined shortcut messages to contacts with minimal user interaction. A user's user device includes a messaging module that allows the user to exchange messages with its contacts through a messaging system. When the user requests a contact interface, the messaging module displays a contact interface that includes multiple rows. Each row includes a contact interface element that is associated with a contact with which the user has or is exchanging messages. FIG. 1A illustrates an example of the contact interface 100. As can be seen, the interface 100 includes multiple contact interface elements 102 associated with different contacts of the user. A contact interface element associated with a contact may include one or more of the following: an identifier associated with the contact (e.g., a name), an image associated with the contact, an indication as to whether the contact is available to chat, a status of the user, the last message received from the contact, and an indication as to whether the user has read the last message received from the contact.

Through a contact's interface element, the user can request to display a conversation interface that includes resources (e.g., a representation of a keyboard) to allow the user to create a message to send to the contact. However, from the contact interface, the user can request to transmit a shortcut message to a contact from a set of predefined shortcut messages without having to access the conversation interface. Each shortcut message is predefined in that the content to be included in the message is already set (e.g., by system administrators). Hence, for a shortcut message, the user does not provide the content to include in the message at the time of sending.

The user indicates the shortcut message to transmit to a contact by shifting the content interface element associated with the contact in a horizontal direction (e.g., from left to right). For example, the user may shift the contact interface element by touching a display of the user device at a location displaying the contact interface element and the user performing a swiping action. When the user ends the shifting of the contact interface element (e.g., by ending the touching of the display), the messaging module automatically transmits a shortcut message to the contact via the messaging system. The shortcut messages transmitted to the contact is based on the magnitude of the shift performed by the user on the contact interface element. The shortcut message transmitted may also be based one or more messages previously exchanged between the user and the contact.

In one embodiment, if the magnitude of the shift is within a first shortcut range and the last message exchanged between the user and the contact was sent by the contact, the messaging module transmits an affirmation shortcut message indicating affirmation by the user (e.g., an image of checkmark or a "Yes" symbol). If the magnitude of the shift is within the first shortcut range and the last message exchanged was sent by the user, the message module transmits an inquiry shortcut message indicating an inquiry by the user (e.g., a question mark). If the magnitude of the shift is in a second shortcut range (e.g., greater than the first shortcut range), regardless of who sent the last message exchanged, the messaging module transmits a call shortcut message asking the contact to call the user. With call shortcut message, the messaging module includes the user's phone number. Hence, the user can quickly send a message to the contact by performing a swiping action on an interface element and without have to enter any text.

Figure 1B:
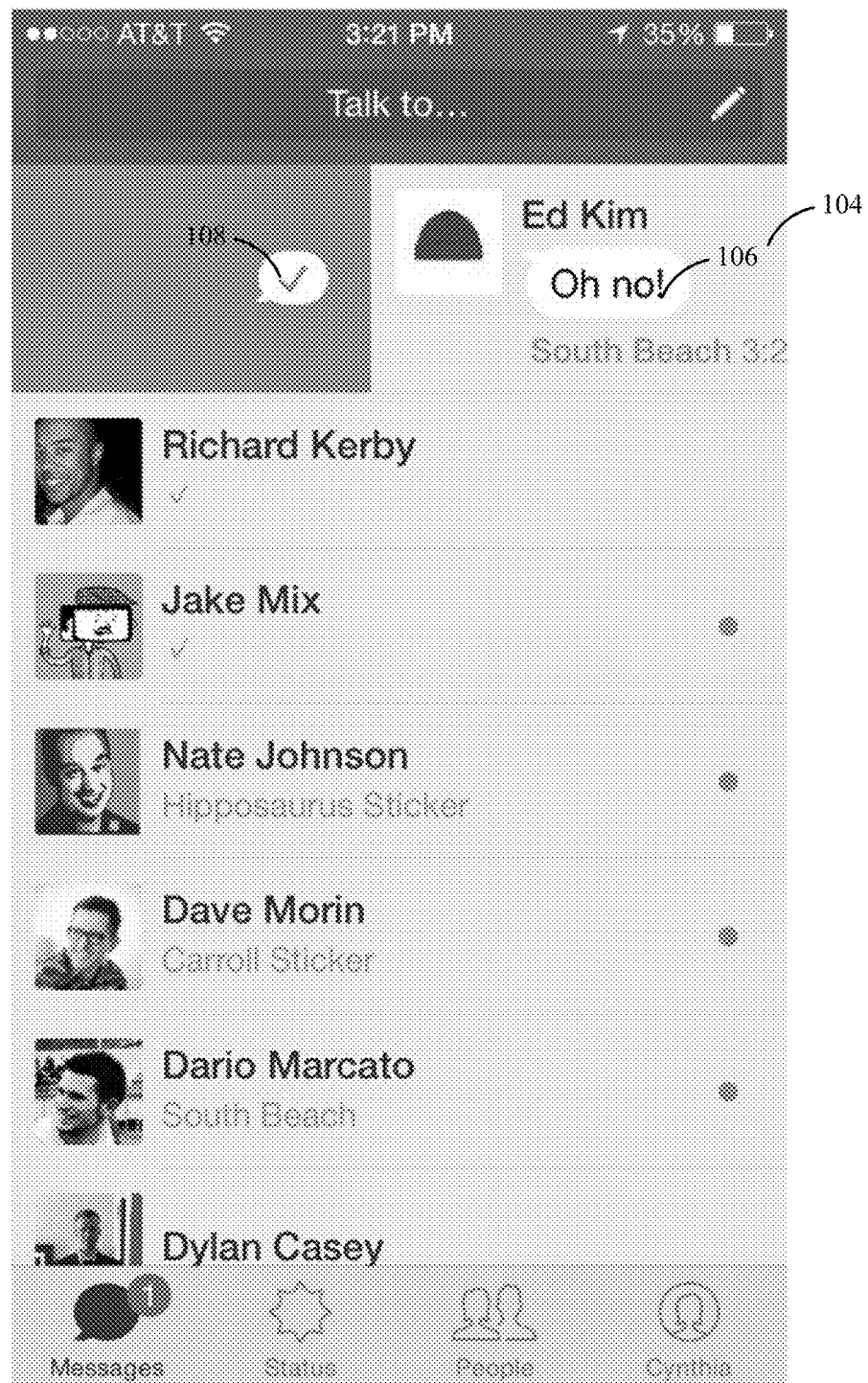
Figure 1C:
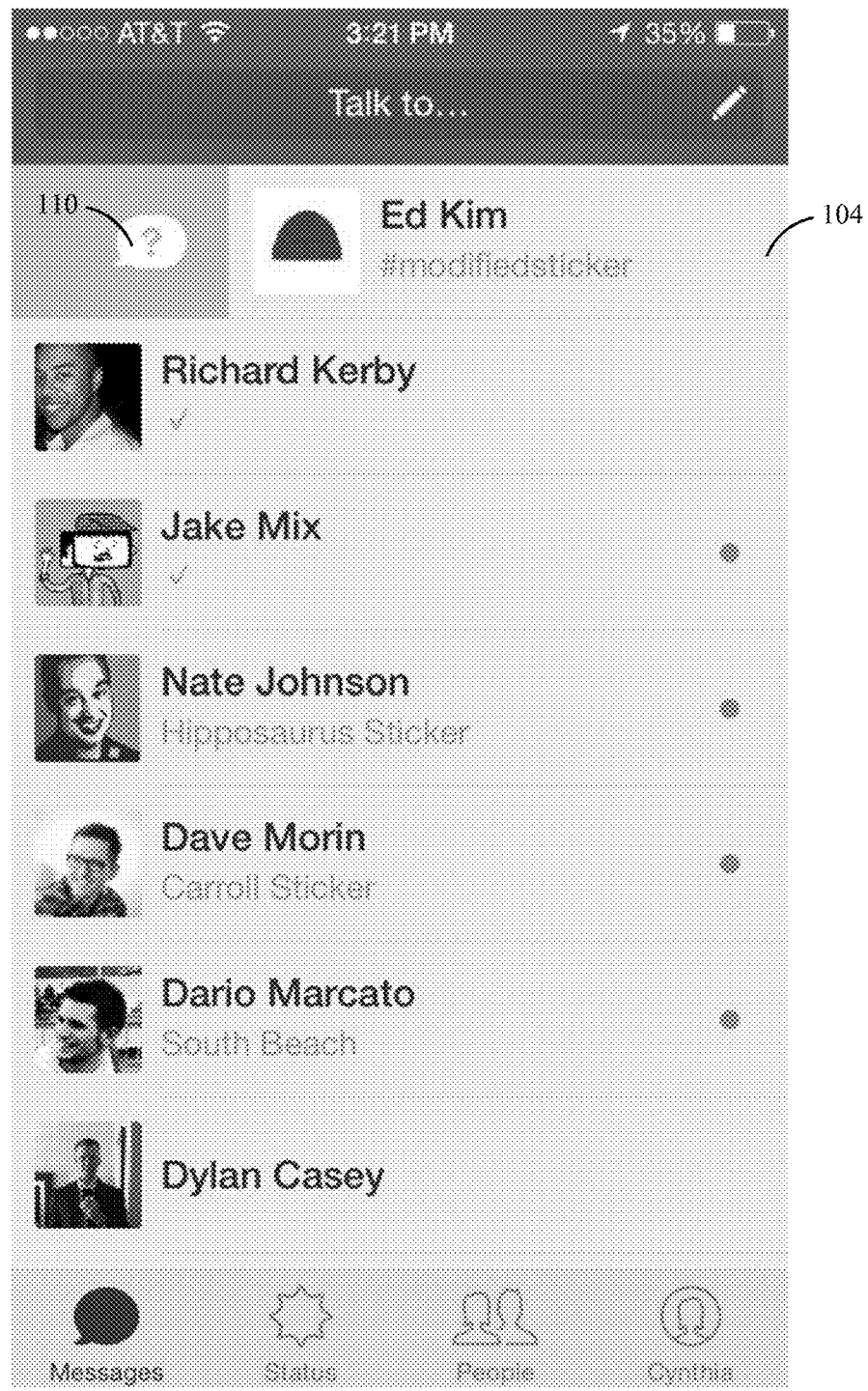
Figure 1D:
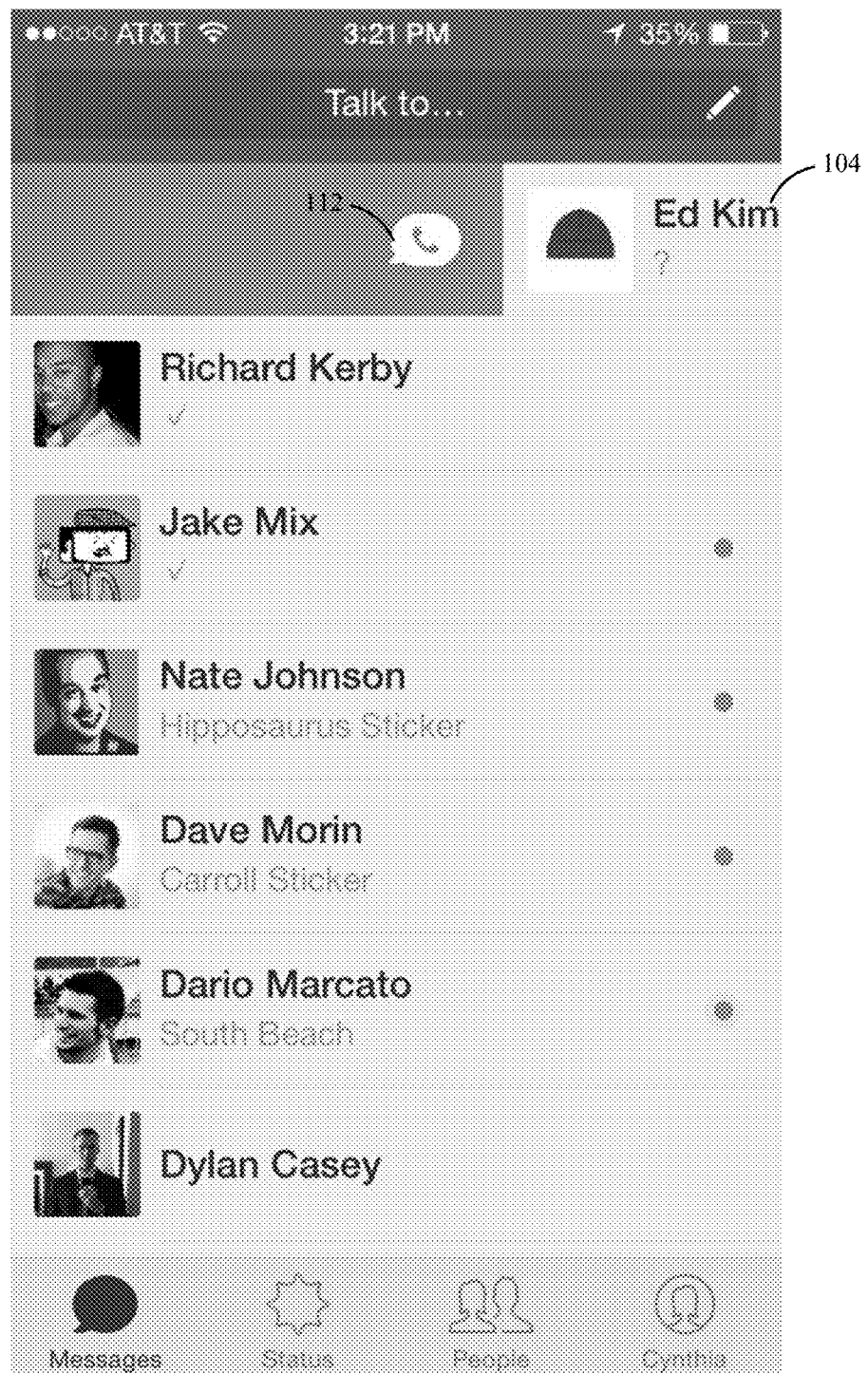

In one embodiment, as the user shifts the contact interface element, the messaging module displays the shortcut message that would be sent if the user ended the shifting at that moment. FIG. 1B illustrates that based on the shifting of interface element 104 being within the first shortcut range and contact having sent the last message 106, icon 108 would be sent to the contact as an affirmation shortcut message. FIG. 1C illustrates the shifting of the interface element 104 still being within the first shortcut range, but in this example the user sent the last message. Hence, icon 110 would be sent to the contact as an inquiry status message in this example. FIG. 1D illustrates that based on the shifting of interface element 104 being within the second shortcut range, a call shortcut message would be sent to the contact including icon 112.

In one embodiment, the user can shift a contact interface element in an opposite horizontal direction (e.g., from right to left) than what is used to send shortcut messages. The user can shift a contact interface element in the opposite direction to perform an action on a conversation between a user and a contact. In one embodiment, if a contact interface element associated with a contact is shifted in the opposite direction and when the shifting is ended the magnitude of the shift is within a first conversation range, the messaging module mutes the conversation (the exchange of messages) between the user and the contact. Muting the conversation may include, for example, not notifying the user when a message is received from the contact or the contact not being able to send messages to the user. If the magnitude of the shifting in the opposite direction shift is within a second conversation range (e.g., greater than the first conversation range), the messaging module deletes each stored messages exchanged between the user and the contact (deletes the conversation).

Figure 1E:
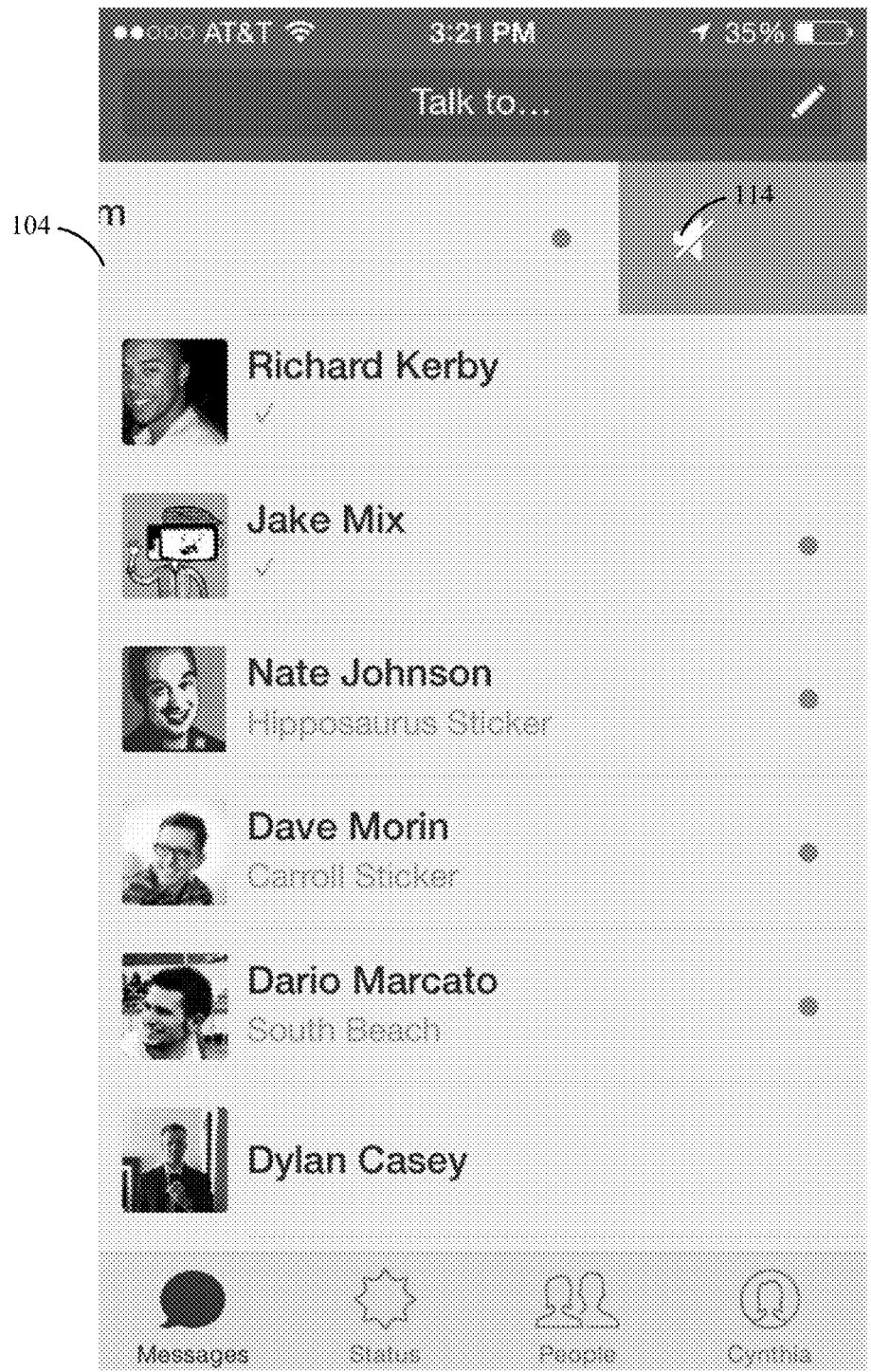
Figure 1F:
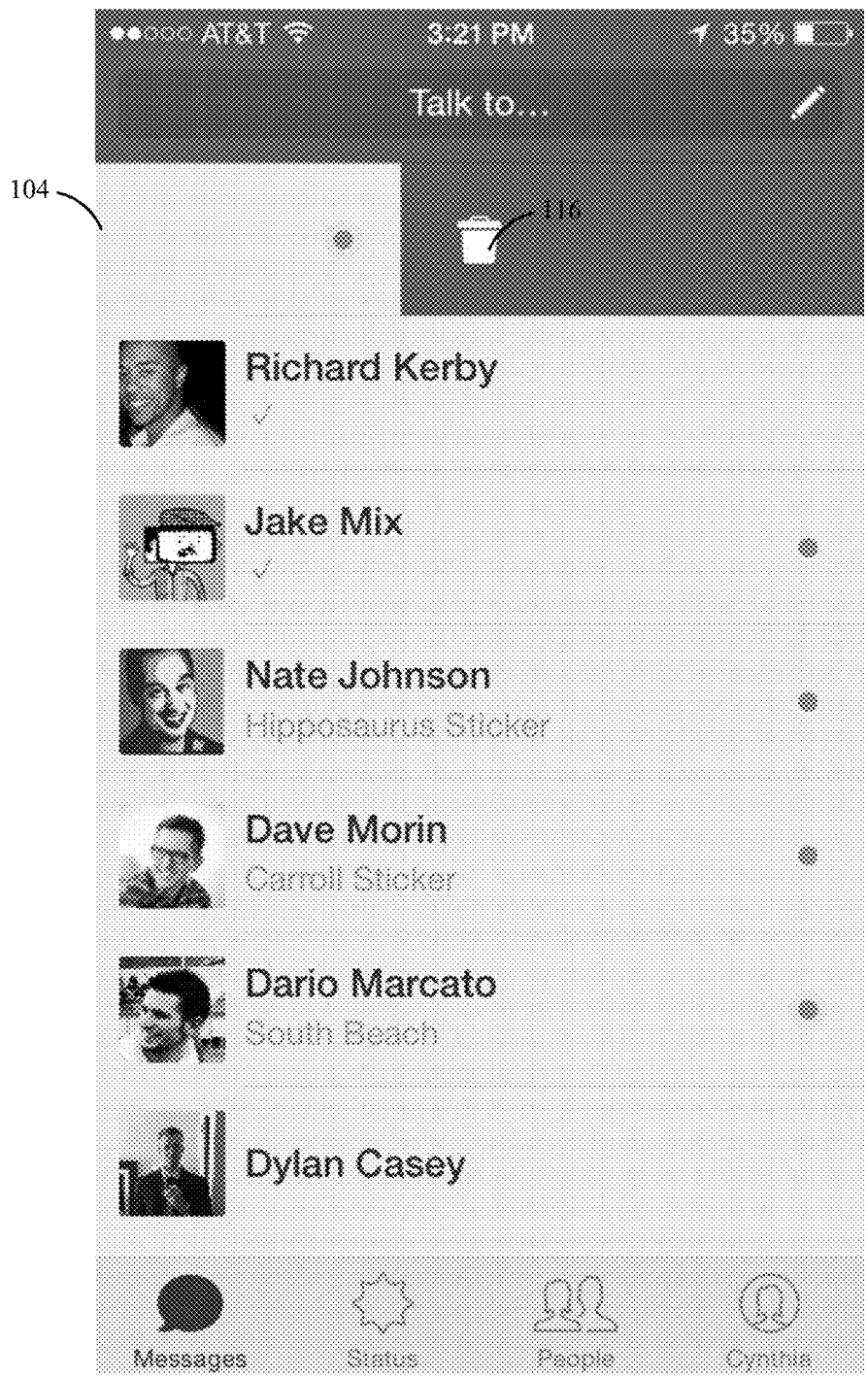

In one embodiment, as the user shifts a contact interface element in the opposite horizontal direction, the messaging module indicates an action that will be performed on a conversation between the user and a contact if the user ends the shifting at that moment. In FIG. 1E, icon 114 illustrates that based on the shifting of interface element 104 in the opposite horizontal direction being within the first conversation range, the conversation between the user and the contact associated with element 104 would be muted if the shifting is ended at that moment. In FIG. 1F, icon 116 illustrates that based on the shifting of interface element 104 in the opposite horizontal direction being within the second conversation range, the conversation between the user and the contact would be deleted if the shifting is ended at that moment.

As described above, the user can request to access a conversation interface for a contact. If the user requests to access a conversation interface for a contact, the messaging module displays the conversation interface. The conversation interface may include prior messages exchanged between the contact, a field in which to include a message to send to the contact and resources to create/input the message, such as a representation of a keyboard and a resource for adding a media item (e.g., a video or picture) to a message.

A resource also included in the conversation interface is a messaging interface element. If the user selects the messaging interface element for longer than a threshold time, the messaging module displays multiple shortcut interface elements. Each shortcut interface element is associated with a different shortcut message. If the user selects a shortcut interface element, the messaging module transmits to the contact the shortcut message associated with the selected shortcut interface element.

Figure 2A:
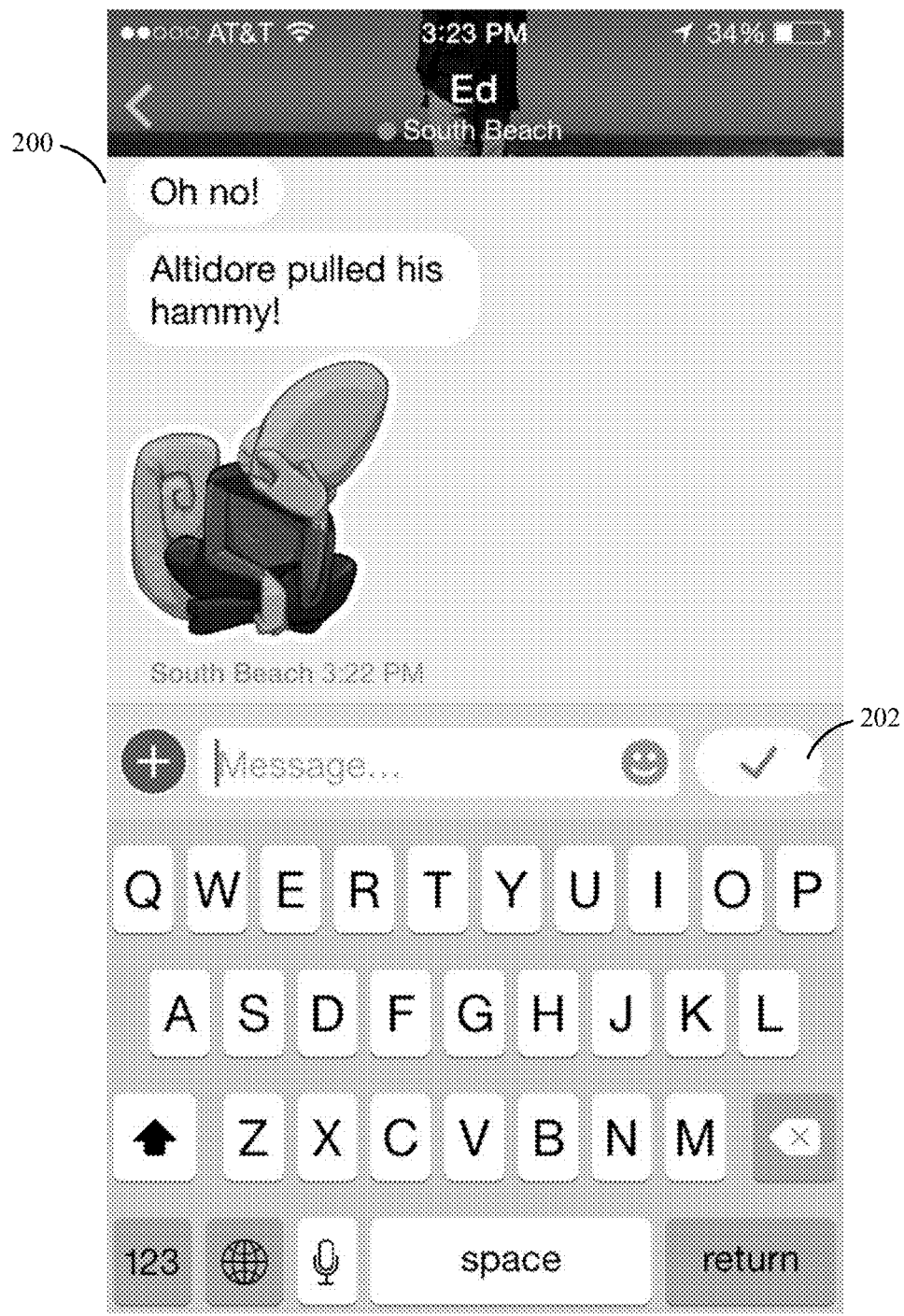
FIGS. 2A and 2B illustrate examples of a conversation interface according to one embodiment.
Figure 2B:
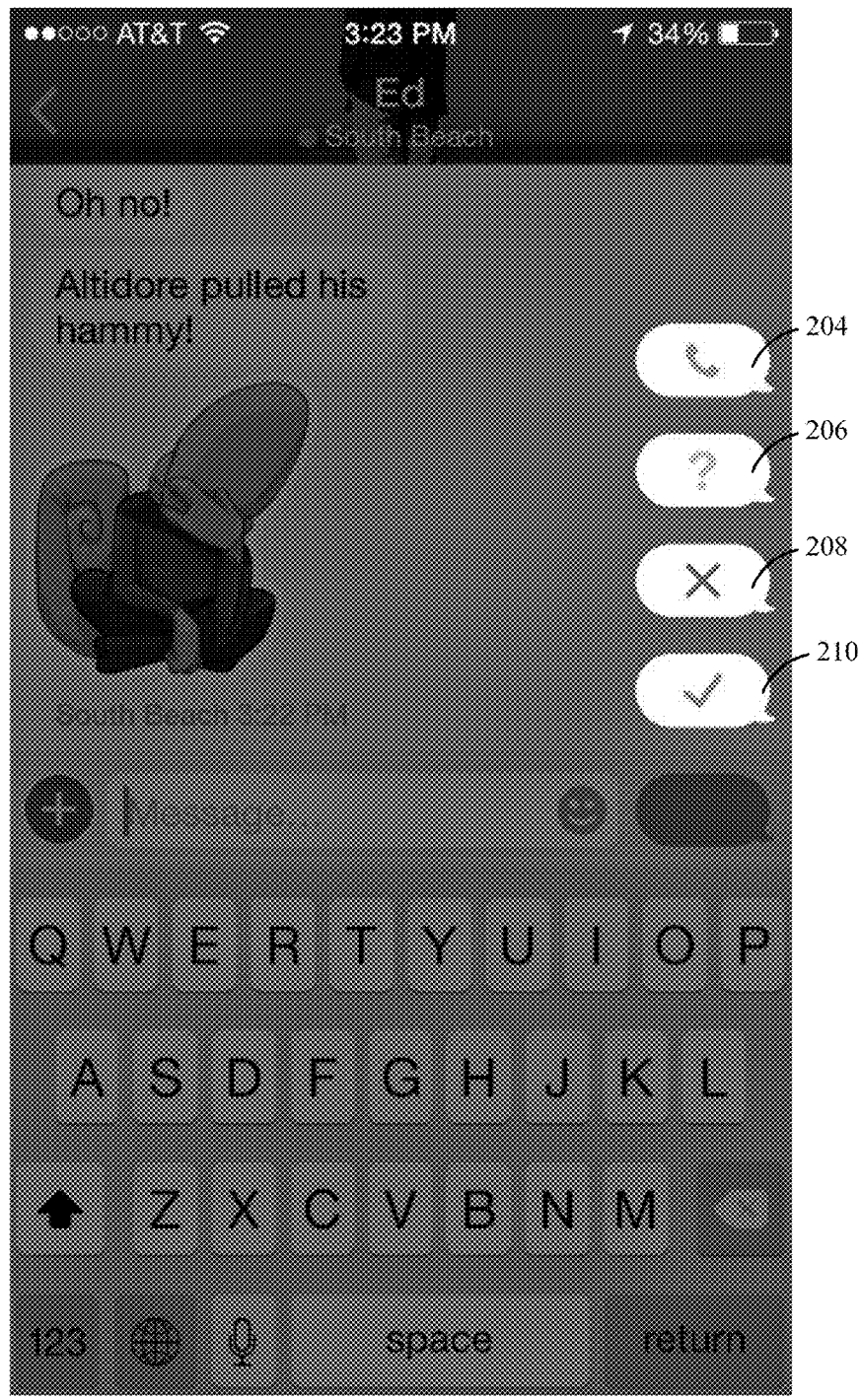

FIG. 2A illustrates an example of a conversation interface 200 and of the messaging interface element 202. FIG. 2B illustrates shortcut interface elements 204, 206, 208, and 210 displayed after messaging interface element 202 is selected by the user for longer than the threshold time. In this example, shortcut interface element 204 is associated with the call shortcut message, shortcut interface element 206 is associated with the inquiry shortcut message, and shortcut interface element 210 is associated with the affirmation shortcut message. Further, shortcut interface element 208 is associated with a denial shortcut message that indicates a denial by the user (e.g., indicates no).

System Architecture

Figure 3:
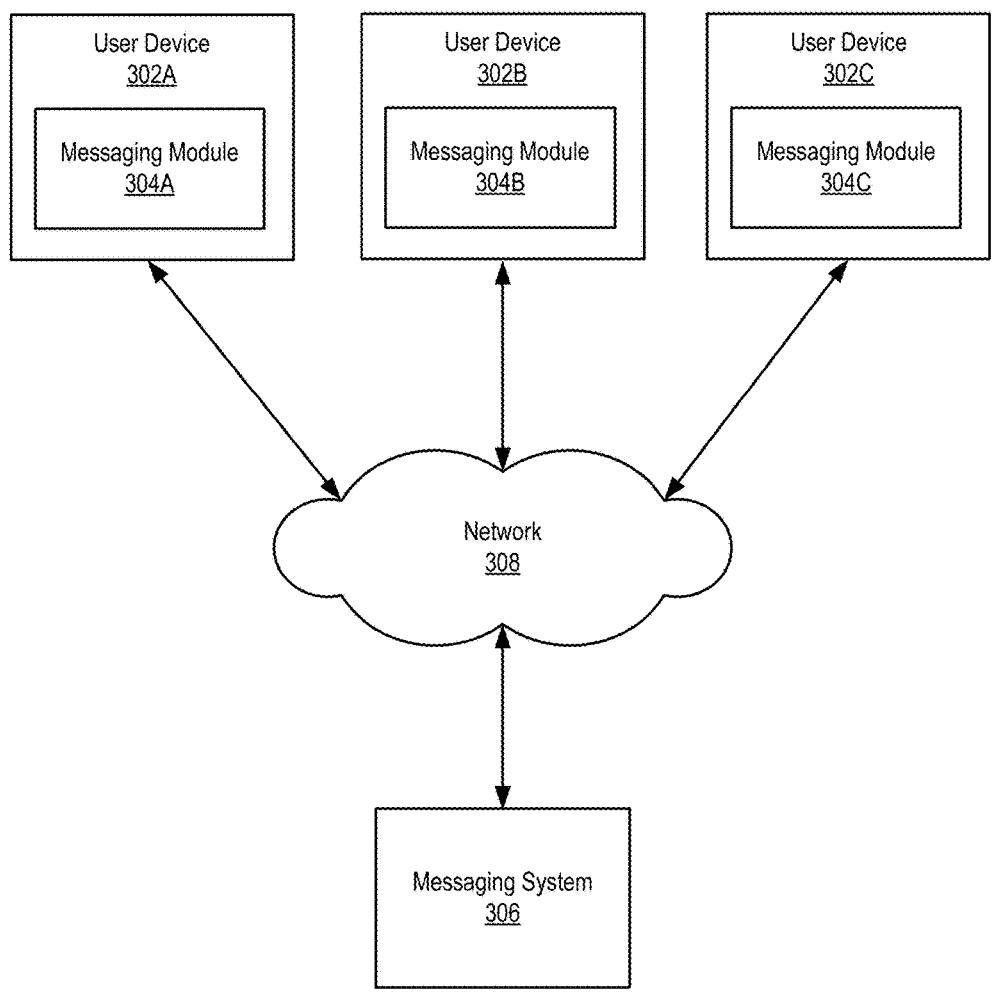
FIG. 3 is a block diagram of a messaging environment according to one embodiment.

FIG. 3 is a block diagram of a messaging environment according to one embodiment. FIG. 3 illustrates user devices 302A, 302B, and 302C, and a messaging system 306 connected via a network 308. Although a select number of each entity are shown in FIG. 3, embodiments can have more or less of each entity (e.g., additional user devices 302).

FIG. 3 and the other figures use like reference numerals to identify like elements. A letter after a reference numeral, such as "302A," indicates that the text refers specifically to the element having that particular reference numeral. A reference numeral in the text without a following letter, such as "302," refers to any or all of the elements in the figures bearing that reference numeral.

A user device 302 is a computing device capable of receiving user inputs as well as transmitting and/or receiving data via the network 308. In one embodiment, a user device 302 is a mobile device, such as a mobile telephone, a tablet computer, or a personal digital assistant (PDA). Alternatively, a user device 302 may be a conventional computer system, such as a desktop computer.

Each user device 302 includes a messaging module 304 that allows a user of the messaging system 306 to exchange messages with its contacts. When a user of a device 302 requests to transmit a message to a contact, the messaging module 304 transmits the message to the messaging system 306 which forwards the message to a device 302 used by the contact to receive messages. In other embodiments, the messaging module 304 transmits the message directly to the contact's device 302 (e.g., through a peer-to-peer connection). A message exchanged via the messaging system 306 may include one or more of the following: text, video content, a picture/still image, audio, animations, graphics, icons, and any other type of media. A contact is a user of the messaging system 306 for which the messaging module 304 stores or is able to access contact information (e.g., a phone number, a user identifier, an email address) that can be used to communicate with the user. A contact may be, for example, a user of the messaging system 306 in an address book/contact list, a user of the messaging system 306 with which the user of the device 302 has a connection in a social network, or someone with whom the user of the device 302 has previously exchanged messages.

The messaging module 304 stores multiple shortcut messages. The content to be included with each shortcut message is preset. In one embodiment, the content to be included with each shortcut is preset by system administrators of the messaging system 306. In one embodiment, the content to be included with each shortcut message cannot be changed by a user of a device 302. In other embodiment, the user can modify the content to be included, for example, as part of user preferences. With each shortcut message, the messaging module 304 stores conditions under which the shortcut message is automatically transmitted by the messaging module 304 to a contact.

In one embodiment, the messaging module 304 stores an affirmation shortcut message, a denial shortcut message, an inquiry shortcut message, and a call shortcut message. The affirmation shortcut message indicates affirmation. In one embodiment, the affirmation shortcut message includes an image of a checkmark. For example, if a contact sends a user a message asking if the user wants pizza for dinner, the user can respond with the affirmation shortcut message indicating that he does want pizza. The denial shortcut message indicates a denial. In one embodiment, the denial shortcut message includes an image with an X. Continuing with the pizza example from above, if the user does not want pizza for dinner, the user can respond with the denial shortcut message.

The inquiry shortcut message indicates that an inquiry is being made. In one embodiment, the inquiry shortcut message includes an image of a question mark. For example, if a user sends a question to a contact but the contact does not respond, the user can send the inquiry shortcut message indicating that the user is expecting a response. The call shortcut message asks a contact to call a user sending the message. In one embodiment, the call shortcut message includes "Call me" text and the messaging module 304 embeds within the message the phone number of the user so that the receiver of the message can call the user by selecting the call shortcut message.

Figure 7A:
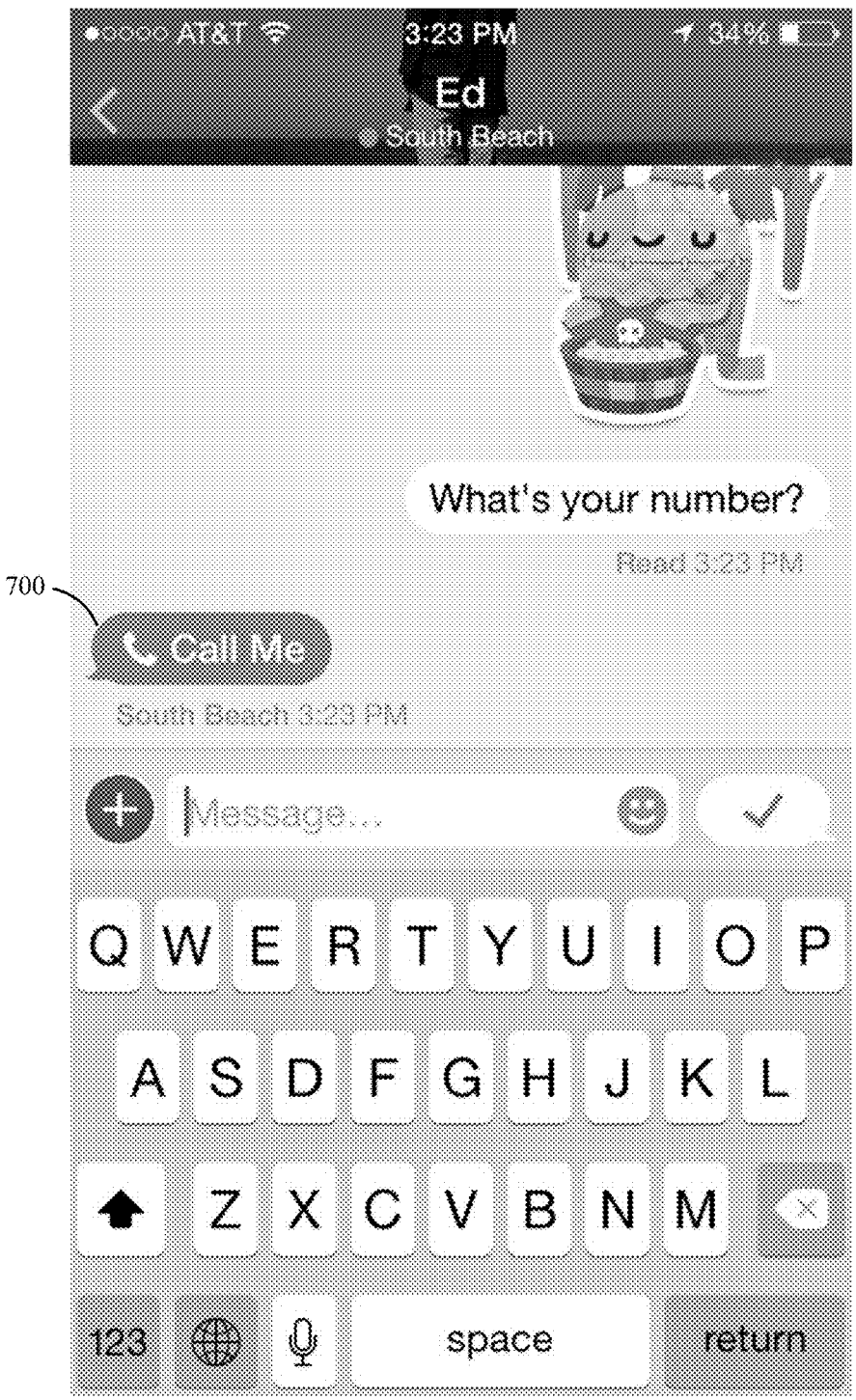
FIGS. 7A-7C illustrate an example of calling a user based on a call shortcut message according to one embodiment.
Figure 7B:
Figure 7C:
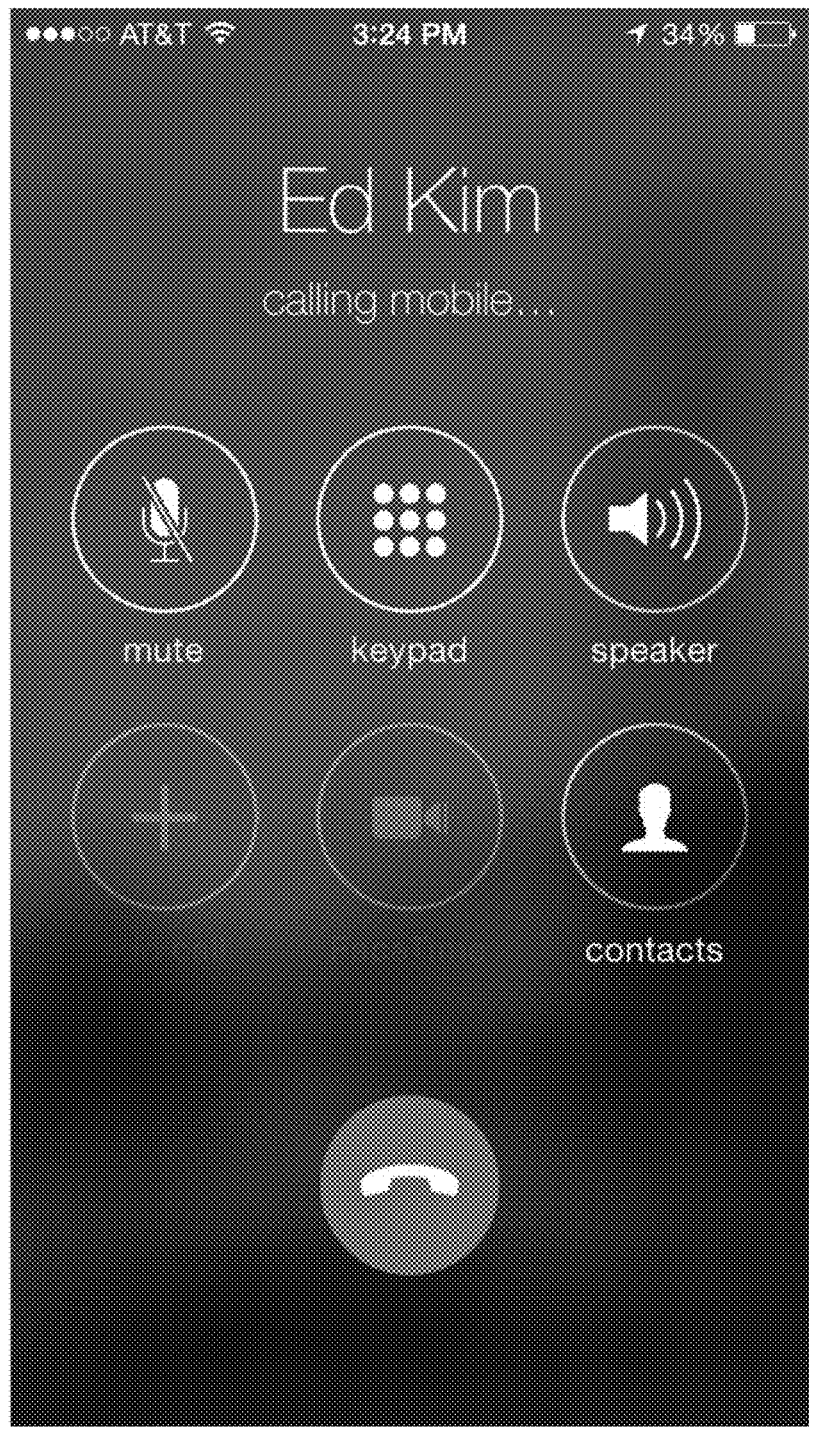

For example, FIG. 7A illustrates a call shortcut message 700 transmitted by a sending user to a receiving user. The phone number of the sending user is embedded within the call shortcut message 700. As illustrated by FIG. 7B, based on the phone number being embedded, if the receiving user selects the call shortcut message, an interface 702 is presented for calling the sending user at the phone number included with the message 700. If the user selects element 704, the call is placed to the sending user at the phone number, as shown in FIG. 7C. Hence, by including the sending user's phone number with the message 700, the receiving user can call the sending user even if the receiving user does not have the sending user's phone number in his address book.

A user of a device 302 executing the messaging module 304 can request to access a contact interface and a conversation interface, among other interfaces. As described above, the contact interface include multiple contact interface elements, each contact interface element is associated with a difference contact of the user. If the messaging module 304 receives an input from the user indicating that a contact interface element be shifted in a horizontal direction (e.g., the user touches a display of the device 302 at a location displaying the contact interface element and performs a swiping motion while continuing to touch the display), the messaging module 304 displays the shifting of the contact interface element according to the input. If there is a break in the input (e.g., the user stops touching the display), the messaging module 304 identifies the magnitude of the shift of the contact interface element and determines an action to perform.

If the shift was in a first horizontal direction (e.g., from left to right), the magnitude of the shift is within a first shortcut range, and the last message exchanged between the user and the contact associated with the contact interface element was sent by the contact, the messaging module 304 transmits to the messaging system 306 the affirmation shortcut message for forwarding to the contact. If the shift was in the first horizontal direction, the magnitude of the shift is within the first shortcut range, but the last message exchanged was sent by the user, the messaging module 304 transmits to the messaging system 306 the inquiry shortcut message for forwarding to the contact. However, if the shift was in the first horizontal direction and the magnitude of the shift is within a second shortcut range (greater than the first shortcut range), the messaging module 304 transmits to the messaging system 306 the call shortcut message for forwarding to the contact. In other embodiments, additional shortcut ranges may exist and different shortcut messages may be associated with each range.

Further, if the shift was in a second horizontal direction (e.g., from right to left) and the magnitude of the shift is within a first conversation range, the messaging module 304 mutes the conversation between the user and the contact. However, if the shift was in the second horizontal direction and the magnitude of the shift is within a second conversation range (greater than the first conversation range), the messaging module 304 deletes the conversation between the user and the contact (deletes stored messages exchanged between the user and the contact).

If the user requests to access a conversation interface to communicate with a contact, the messaging module 304 displays to the user the requested conversation interface. The conversation interface includes previous messages exchanged between the user and the contact, a message field for including a message to send to the contact, a representation of a keyboard, a resource for adding a media item (e.g., a video or picture) to a message, and a messaging interface element. If the messaging module 304 receives a selection by the user of the messaging interface element, the messaging module 304 tracks the length of the selection. In one embodiment, if the length of the selection is greater than a threshold time, the messaging module 304 displays multiple shortcut interface elements, each associated with a different shortcut message. If the user selects a shortcut interface element, the messaging module 304 transmits to the messaging system 306 the shortcut message associated with selected shortcut interface element for forwarding to the contact.

In one embodiment, if the length of selection of the messaging interface element is less than the threshold time, the messaging module 304 transmits any message included in the message field. If no message is included in the message field, no action is performed by the messaging module 304. Hence, in this embodiment, the messaging interface element can be used to transmit messages included in the message field and to transmit shortcut messages. In another embodiment, if the length of selection of the messaging interface element is less than the threshold time, the messaging module 304 transmits a shortcut message designated as a default (e.g., the affirmation shortcut message is sent).

The messaging system 306 is a computer system that allows users to exchange messages. For each user, the messaging system 306 stores contact information. When the messaging system 306 receives a message from a user's device 302 for forwarding to a receiving user (e.g., a contact of the sending user), the messaging system 306 forwards the message to a device operated by the receiving user.

It should be understood that operations described herein as being performed by a user device 302/messaging module 304 may be performed by the messaging system 306 in other embodiments. Similarly, operations described as being performed by the messaging system 306 can be performed by a user device 302 in other embodiments.

The network 308 enables communications between the various entities of the environment 300. In one embodiment, the network 308 uses standard communications technologies and/or protocols. Thus, the network 308 can include links using technologies such as Ethernet, Wireless Fidelity (WiFi) (e.g., 802.11), worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 308 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 308 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 308 can also include links to other networks such as the Internet.

Figure 4:
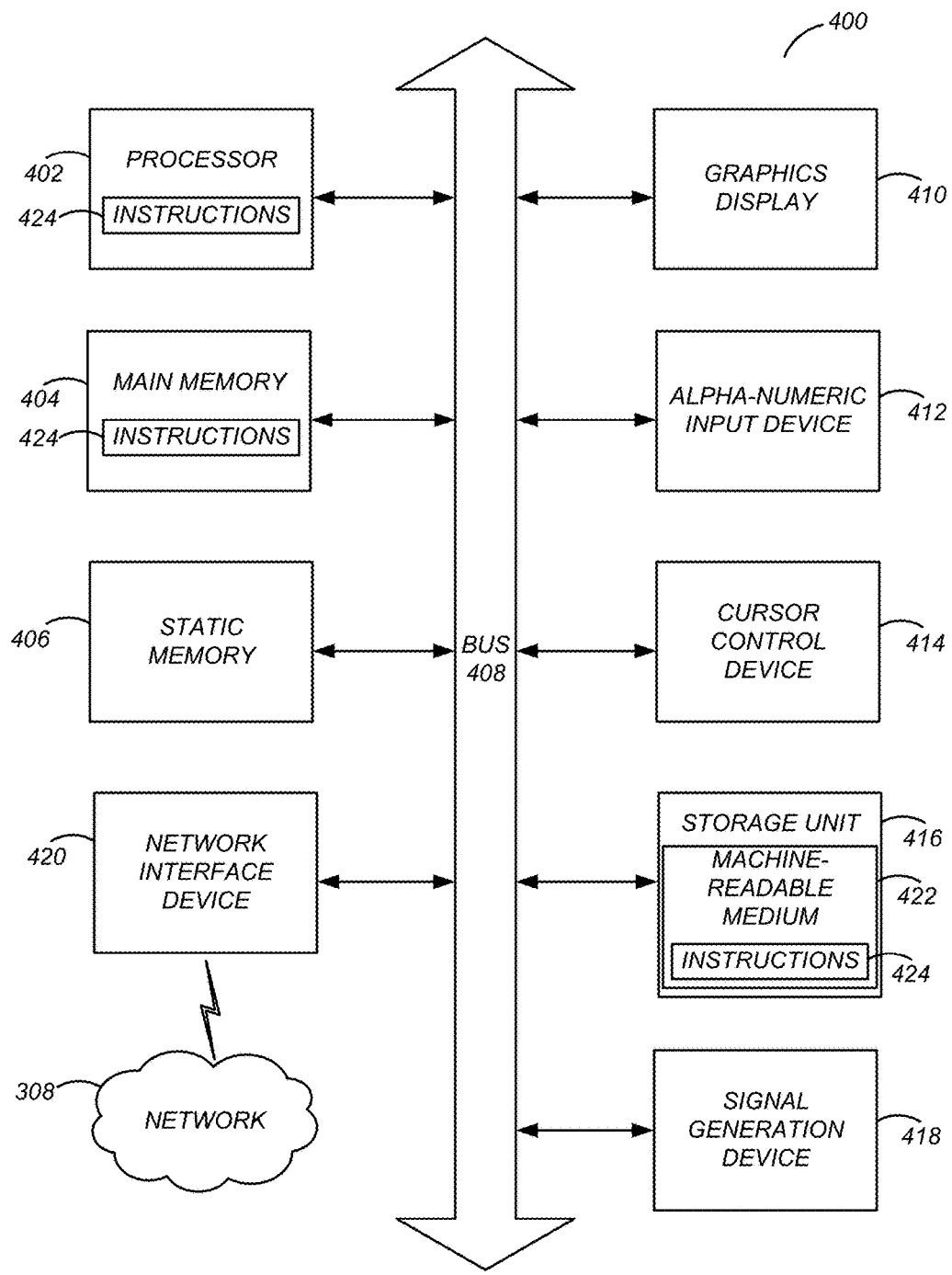
FIG. 4 illustrates one embodiment of components of an example machine able to read instructions from a machine-readable medium and execute them in a processor (or controller).

FIG. 4 is a block diagram illustrating components of an example machine able to read instructions from a machine-readable medium and execute them in a processor or multiple processors (or controller or multiple controllers). Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processors 402 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 400 also includes a main memory 404 and a static memory 406. The components of the computer system 400 are configured to communicate with each other via a bus 408. The computer system 400 may further include graphics display unit 410 (e.g., a plasma display panel (PDP), a liquid crystal display (LCD)) which may be configured for capacitive or inductive touch sensitivity to allow for direct interaction with software user interfaces through the display 410. The computer system 400 may also include alphanumeric input device 412 (e.g., a keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over the network 308 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Example Processes

Figure 5:
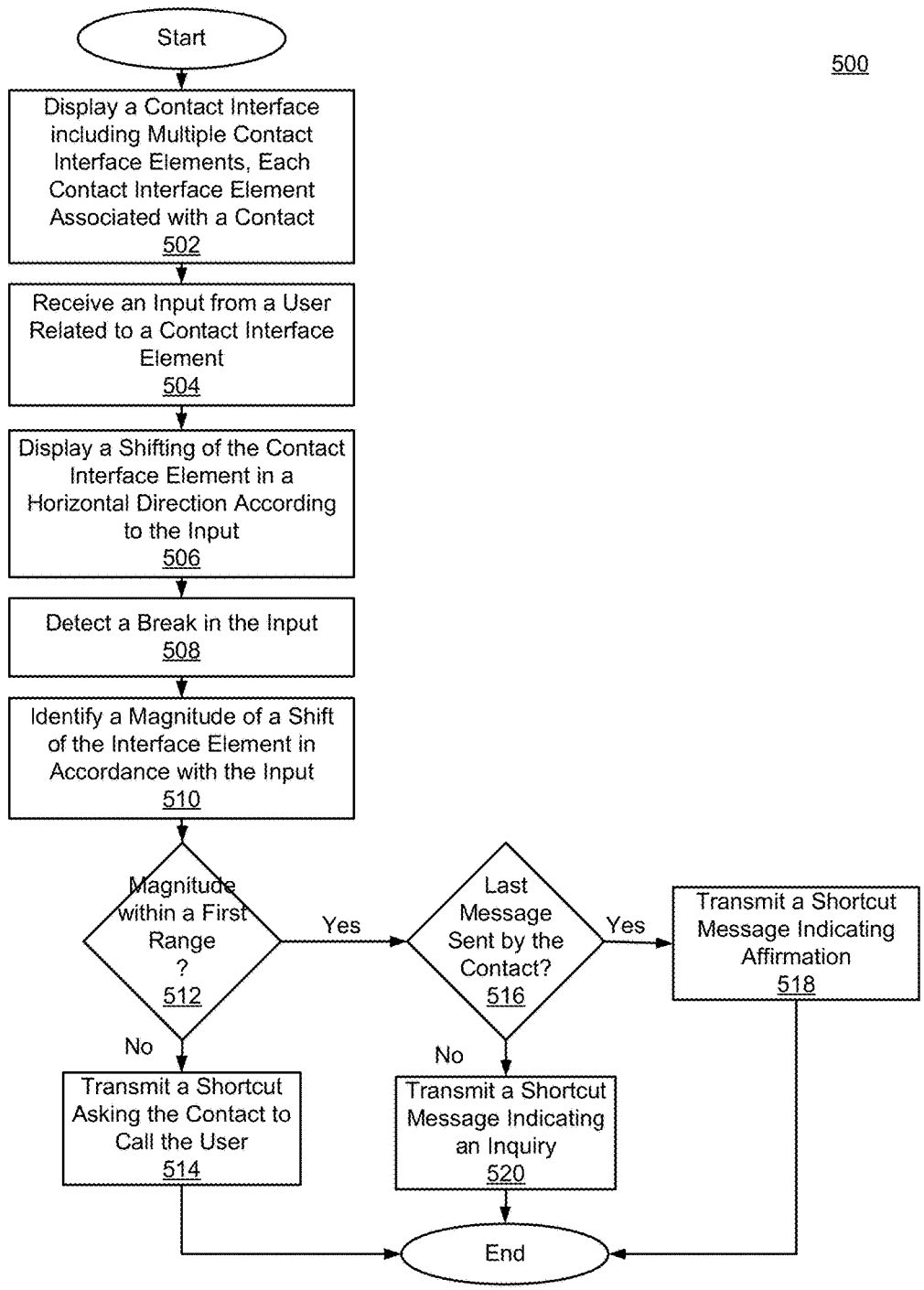
FIG. 5 is a flow chart illustrating a process for efficiently sending shortcut messages to contacts from a contact interface according to one embodiment.

FIG. 5 is a flow chart illustrating a process 500 for efficiently sending shortcut messages to contacts from a contact interface according to one embodiment. Those of skill in the art will recognize that other embodiments can perform the steps of FIG. 5 in different orders. Moreover, other embodiments can include different and/or additional steps than the ones described herein. Likewise, multiple instances of the steps may be performed in parallel.

A user device 302 of a user displays 502 a contact interface including multiple contact interface elements, each contact interface element is associated with a different contact of the user. The user device 302 receives 504 an input from the user related to a contact interface element. The input indicates that the contact interface element be shifted in a horizontal direction associated with sending shortcut messages. The user device 302 displays 506 a shifting of the contract interface element in the horizontal direction according to the input.

When the user device 302 detects 508 a break in the input, the user device 510 identifies 510 a magnitude of the shift of the contact interface element when the break in the input occurred. The user device 302 determines 512 whether the magnitude of the shift is within a first shortcut range. If the magnitude is not within the first shortcut range (meaning it is within a second shortcut range), the user device 302 transmit 514 to the contact a call shortcut message asking the contact to call the user.

On the other hand, if the magnitude is within the first shortcut range, the user device 302 determines 516 whether the last message exchanged between the user and the contact was sent by the contact. If the last message was sent by the contact, the user device 302 transmits 518 an affirmation shortcut message indicating affirmation. However, if the last message was sent by the user, the user device 302 transmits 520 an inquiry shortcut message indicating an inquiry by the user.

Figure 6:
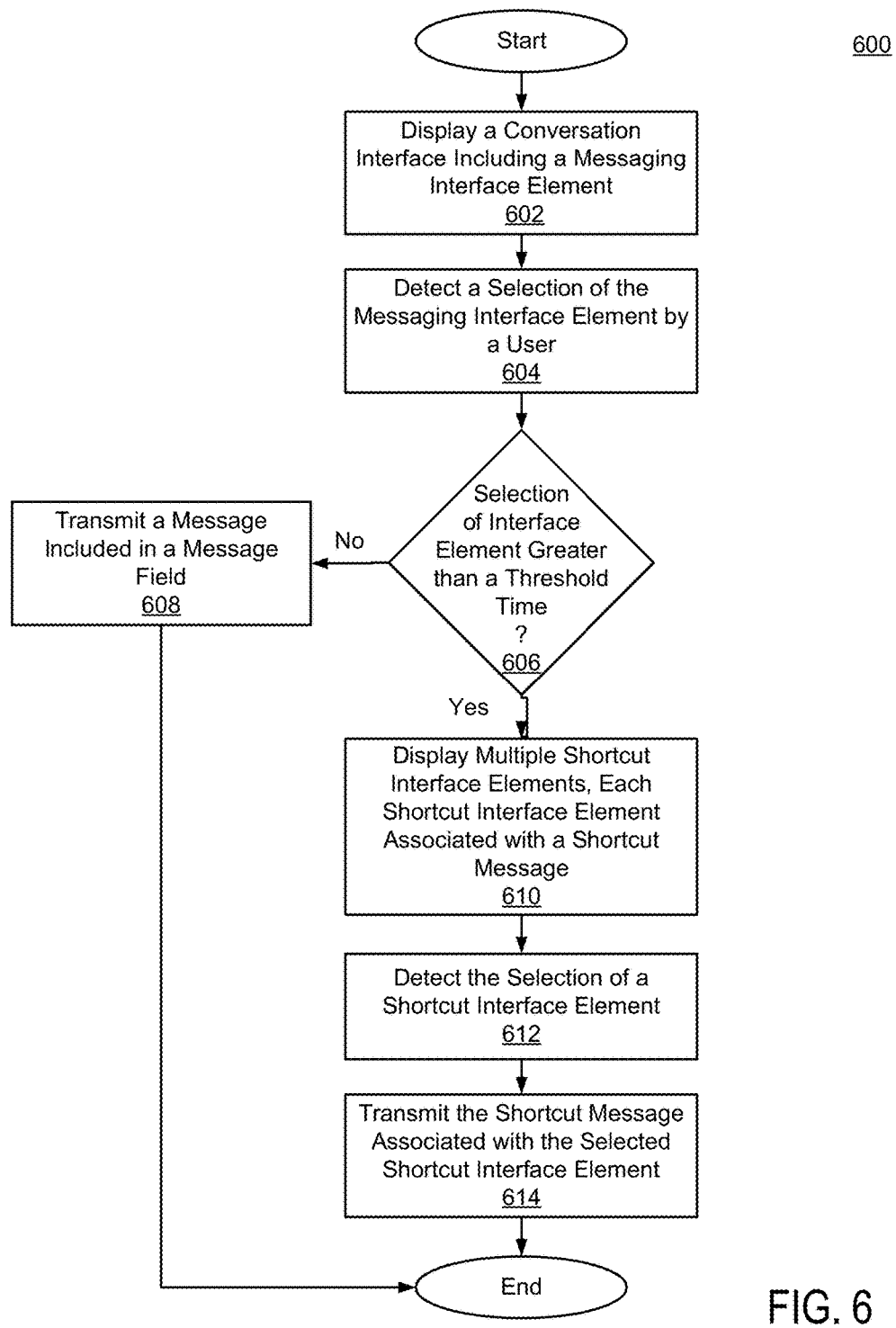
FIG. 6 is a flow chart illustrating a process for sending a message to a contact from a conversation interface according to one embodiment.

FIG. 6 is a flow chart illustrating a process 600 for sending a message to a contact from a conversation interface according to one embodiment. Those of skill in the art will recognize that other embodiments can perform the steps of FIG. 6 in different orders. Moreover, other embodiments can include different and/or additional steps than the ones described herein. Likewise, multiple instances of the steps may be performed in parallel.

Assume for purposes of this example that a user of a user device 302 requests a conversation interface for communicating with a contact. The user device 302 displays 602 a conversation interface including a messaging interface element, a message field, and a representation of a keyboard. The user device 302 detects 604 a selection of the messaging interface element by the user. The user device 302 determines 606 whether the duration of the selection was greater than a threshold time. If the selection was not greater than the threshold time, the user device 302 transmits 608 a message to the contact included in the message field. If no message is included in the message field, the user device 302 performs no action in response to the selection of the messaging interface element.

If the selection was greater than the threshold time, the user device 302 displays 610 multiple shortcut interface elements. Each of the shortcut interface elements is associated with a shortcut message. The user device 302 detects 612 the selection of a shortcut interface element by the user and transmits 614 the shortcut message associated with the selected shortcut interface element to the user.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   receiving, by a user device, an input from a user related to an interface element associated with a contact;
   displaying, by the user device, shifting of the interface element according to the input;
   responsive to a break in the input, identifying, by the user device, a preset message to transmit to the contact based on a magnitude of a shift of the interface element in accordance with the input; and
   transmitting, by the user device, the identified preset message to the contact,
   wherein identifying the preset message comprises:
   identifying the magnitude of the shift being within a range from among a plurality of ranges;
   determining a sender of a last message in a conversation between the user and the contact; and
   identifying the preset message, from among messages, based on a combination of the determined sender and the identified magnitude being associated with the range, each message being associated with a different combination.

2. The method of claim 1, wherein identifying the preset message comprises:
   responsive to the magnitude being within a first range, determining a sender of a last message exchanged between the user and the contact; and
   identifying the preset message based on the sender of the last message.

3. The method of claim 2, wherein identifying the preset message comprises:
   responsive to determining the contact was the sender of the last message, identifying the preset message based on the preset message indicating affirmation by the user.

4. The method of claim 2, wherein identifying the preset message comprises:
   responsive to determining the user was the sender of the last message, identifying the preset message based on the preset message indicating an inquiry by the user.

5. The method of claim 1, wherein the interface element is included in a contact interface including a plurality of interface elements, each of the plurality of interface elements associated with a different contact.

6. The method of claim 1, wherein the interface element is shifted in a first direction in accordance with the input, and the method further comprising:
   receiving, by the user device, an additional input from the user related to the interface element;
   displaying, by the user device, shifting of the interface element in a second direction according to the additional input;
   responsive to a break in the additional input and a magnitude of a shift of the interface element in the second direction being within a first range, muting, by the user device, a conversation between the user and the contact.

7. The method of claim 6, wherein muting the conversation comprises blocking messages sent from the contact to the user.

8. The method of claim 6, further comprising:
   responsive to muting the conversation, preventing presentation of a notification indicating that a message was received from the contact.

9. The method of claim 1, wherein the interface element is shifted in a first direction in accordance with the input, and the method further comprising:
   receiving, by the user device, an additional input from the user related to the interface element;

displaying, by the user device, shifting of the interface element in a second direction according to the additional input;

responsive to a break in the additional input and a magnitude of a shift of the interface element in the second direction being within a second range, deleting, by the user device, at least one message exchanged between the user and the contact.

10. The method of claim 1, wherein identifying the preset message comprises:

responsive to the magnitude being within a second range, identifying the preset message indicating that the contact call the user; and including with the identified preset message a phone number associated with the user.

11. A computer program product comprising a non-transitory computer-readable storage medium containing computer program code for:

receiving, by a user device, an input from a user related to an interface element associated with a contact;

displaying, by the user device, shifting of the interface element according to the input;

responsive to a break in the input, identifying, by the user device, a preset message to transmit to the contact based on a magnitude of a shift of the interface element in accordance with the input; and transmitting, by the user device, the identified preset message to the contact, wherein identifying the preset message comprises:

identifying the magnitude of the shift being within a range from among a plurality of ranges;

determining a sender of a last message in a conversation between the user and the contact; and identifying the preset message, from among messages, based on a combination of the determined sender and the identified magnitude being associated with the range, each message being associated with a different combination.

12. The computer program product of claim 11, wherein identifying the preset message comprises:

responsive to the magnitude being within a first range, determining a sender of a last message exchanged between the user and the contact; and responsive to determining the contact was the sender of the last message, identifying the preset message based on the preset message indicating affirmation by the user.

13. The computer program product of claim 11, wherein the interface element is shifted in a first direction in accordance with the input, and the computer program code further for:

receiving, by the user device, an additional input from the user related to the interface element;

displaying, by the user device, shifting of the interface element in a second direction according to the additional input;

responsive to a break in the additional input and a magnitude of a shift of the interface element in the second direction being within a first range, muting, by the user device, a conversation between the user and the contact.

14. The computer program product of claim 11, wherein the interface element is shifted in a first direction in accordance with the input, and the computer program code further for:

receiving, by the user device, an additional input from the user related to the interface element;

displaying, by the user device, shifting of the interface element in a second direction according to the additional input;

responsive to a break in the additional input and a magnitude of a shift of the interface element in the second direction being within a second range, deleting, by the user device, at least one message exchanged between the user and the contact.

* * * * *